(12) United States Patent
Jamjoom et al.

(10) Patent No.: US 10,025,629 B2
(45) Date of Patent: *Jul. 17, 2018

(54) SYSTEM AND METHOD FOR DYNAMIC RESCHEDULING OF MULTIPLE VARYING RESOURCES WITH USER SOCIAL MAPPING

(71) Applicant: INTERNATIONAL BUSINESS MACHINES CORPORATION, Armonk, NY (US)

(72) Inventors: Hani T. Jamjoom, White Plains, NY (US); Mark E. Podlaseck, Kent, CT (US); Huiming Qu, White Plains, NY (US); Yaoping Ruan, White Plains, NY (US); Zon-Yin Shae, South Salem, NY (US); Anshul Sheopuri, Hartdsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 324 days.

This patent is subject to a terminal disclaimer.

(21) Appl. No.: 14/825,882

(22) Filed: Aug. 13, 2015

(65) Prior Publication Data

US 2015/0347191 A1 Dec. 3, 2015

Related U.S. Application Data

(63) Continuation of application No. 13/915,289, filed on Jun. 11, 2013, now Pat. No. 9,135,068, which is a
(Continued)

(51) Int. Cl.
*G06F 9/46* (2006.01)
*G06F 9/50* (2006.01)

(52) U.S. Cl.
CPC .................................. *G06F 9/50* (2013.01)

(58) Field of Classification Search
None
See application file for complete search history.

(56) References Cited

U.S. PATENT DOCUMENTS 6,434,380 B1 8/2002 Andersson et al.
7,640,547 B2 12/2009 Neiman et al.
(Continued)

OTHER PUBLICATIONS

Non-Final Office Action dated Sep. 26, 2013 for U.S. Appl. No. 13/599,503.
(Continued)

*Primary Examiner* — Adam Lee
(74) *Attorney, Agent, or Firm* — Tutunjian & Bitetto, P.C.; Louis J. Percello

(57) ABSTRACT

A system and method for scheduling resources includes a memory storage device having a resource data structure stored therein which is configured to store a collection of available resources, time slots for employing the resources, dependencies between the available resources and social map information. A processing system is configured to set up a communication channel between users, between a resource owner and a user or between resource owners to schedule users in the time slots for the available resources. The processing system employs social mapping information of the users or owners to assist in filtering the users and owners and initiating negotiations for the available resources.

9 Claims, 8 Drawing Sheets

Related U.S. Application Data continuation of application No. 12/856,192, filed on Aug. 13, 2010, now Pat. No. 8,479,212.

(56) References Cited

U.S. PATENT DOCUMENTS

| | | | | |
|---|---|---|---|---|
| 8,032,622 | B2* | 10/2011 | Caspi | G06Q 10/10 709/218 |
| 8,204,790 | B1* | 6/2012 | Rogers | G06Q 30/0601 705/26.1 |
| 8,417,785 | B2* | 4/2013 | Fisher | G06Q 10/10 705/1.1 |
| 8,639,650 | B1* | 1/2014 | Gill | G06N 5/04 706/61 |
| 2002/0087734 | A1 | 7/2002 | Marshall et al. | |
| 2004/0186738 | A1* | 9/2004 | Reisman | G06Q 10/10 705/26.1 |
| 2005/0076339 | A1 | 4/2005 | Merril et al. | |
| 2005/0131773 | A1 | 6/2005 | Daur et al. | |
| 2006/0009987 | A1* | 1/2006 | Wang | G06F 9/50 705/7.13 |
| 2006/0293936 | A1 | 12/2006 | Breiter et al. | |
| 2007/0094665 | A1 | 4/2007 | Jackson | |
| 2007/0198398 | A1* | 8/2007 | Rios | G06Q 30/00 705/37 |
| 2007/0255835 | A1 | 11/2007 | Coppinger et al. | |
| 2008/0082980 | A1* | 4/2008 | Nessland | G06Q 10/02 718/104 |
| 2008/0104367 | A1 | 5/2008 | Blumrich et al. | |
| 2008/0189718 | A1* | 8/2008 | Gulley | G06F 9/5066 718/107 |
| 2008/0255977 | A1* | 10/2008 | Altberg | G06F 17/30979 705/35 |
| 2009/0106040 | A1* | 4/2009 | Jones | G06Q 30/02 705/319 |
| 2009/0154899 | A1* | 6/2009 | Barrett | H04N 7/17318 386/293 |
| 2009/0210494 | A1* | 8/2009 | Fisher | G06Q 10/10 709/205 |
| 2009/0292814 | A1 | 11/2009 | Ting et al. | |
| 2010/0125803 | A1* | 5/2010 | Johnson | G06F 17/30873 715/760 |
| 2010/0153160 | A1 | 6/2010 | Bezemer et al. | |
| 2010/0205605 | A1* | 8/2010 | Johnson | G06Q 10/1093 718/102 |
| 2010/0257015 | A1 | 10/2010 | Molander | |
| 2010/0281166 | A1 | 11/2010 | Buyya et al. | |
| 2011/0047273 | A1 | 2/2011 | Young, Jr. et al. | |
| 2011/0106557 | A1* | 5/2011 | Gazula | G06Q 10/10 705/3 |
| 2011/0282793 | A1* | 11/2011 | Mercuri | G06Q 30/0214 705/80 |
| 2012/0324470 | A1 | 12/2012 | Jamjoon et al. | |

OTHER PUBLICATIONS

Non-Final Office Action dated Nov. 29, 2013 for U.S. Appl. No. 12/856,216.

Final Office Action dated Feb. 3, 2014 for U.S. Appl. No. 13/599,503.

Office Action issued in U.S. Appl. No. 12/856,216 dated Oct. 3, 2014, pp. 1-26.

* cited by examiner

SYSTEM AND METHOD FOR DYNAMIC RESCHEDULING OF MULTIPLE VARYING RESOURCES WITH USER SOCIAL MAPPING

CROSS-REFERENCE TO RELATED APPLICATIONS

This application is a Continuation application of allowed co-pending U.S. patent application Ser. No. 13/915,289 filed on Jun. 11, 2013, which is a continuation of U.S. Pat. No. 8,479,212 issued on Jul. 2, 2013, incorporated herein by reference in their entirety.

BACKGROUND

Technical Field

The present invention relates to scheduling resource time and more particularly to system and methods for scheduling resource usage which permits social interaction and negotiation between users and entities.

Description of the Related Art

It is often difficult to estimate or even approximate the run time of high performance computer (HPC) applications. Consequently, either the application execution is completed long before a user's reserved time slot, or the application still needs more time to run when the reserved time slot has expired. HPC is a very rare and expensive resource. Use of HPC resources need to be efficient in order to be economically beneficial.

Conventional systems only support system level rescheduling, that is, users ask the system to reschedule a reserved time slot. When the system does not have enough resources at the particular time slot requested, user requests for rescheduling are rejected. This creates user dissatisfaction, and wastes critical HPC resources since the user's application needs to be terminated and rerun from the beginning at another time slot.

SUMMARY

A system and method for scheduling resources includes a memory storage device having a resource data structure stored therein which is configured to store a collection of available resources, time slots for employing the resources, dependencies between the available resources and social map information. A processing system is configured to set up a communication channel between users, between a resource owner and a user or between resource owners to schedule users in the time slots for the available resources. The processing system employs social mapping information of the users or owners to assist in filtering the users and owners and initiating negotiations for the available resources.

Another system for scheduling resources includes a memory storage device having a resource data structure stored therein which is configured to store a collection of available resources, time slots for employing the resources, dependencies between the available resources and social map information; and a processing system configured to set up a communication channel between users, between a resource owner and a user, between resource owners or the processing system and the users or owners to schedule users in the time slots for the available resources wherein the processing system employs social mapping information of the users or owners to assist in filtering the users and owners and initiating negotiations for the available resources.

A method for scheduling resources includes providing a catalog of available resources and time slots for accessing the resources, the catalog being stored in computer storage memory; enabling scheduling of the available resources and the time slots by machine or by users by determining relationships using social maps of the users and resource owners to filter catalog entries; providing a channel for communication between owners and users, between users and users and/or between the machine and users/owners based on the social maps such that negotiation and collaboration can occur therebetween for scheduling the available resources; and updating the catalog in accordance with results of negotiations and collaborations.

A method for scheduling resources includes providing a catalog of available resources and time slots for accessing the resources, the catalog being stored in computer storage memory; enabling scheduling of the available resources and the time slots by determining relationships using social maps of the users and resource owners to filter catalog entries, wherein filtered catalog entries indicate the available resources that are to be included in resource negotiations and collaborations; providing a channel for communication based on the social maps such that the resource negotiations and collaborations occur therebetween for scheduling the available resources; and updating the catalog in accordance with results of the resource negotiations and collaborations.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
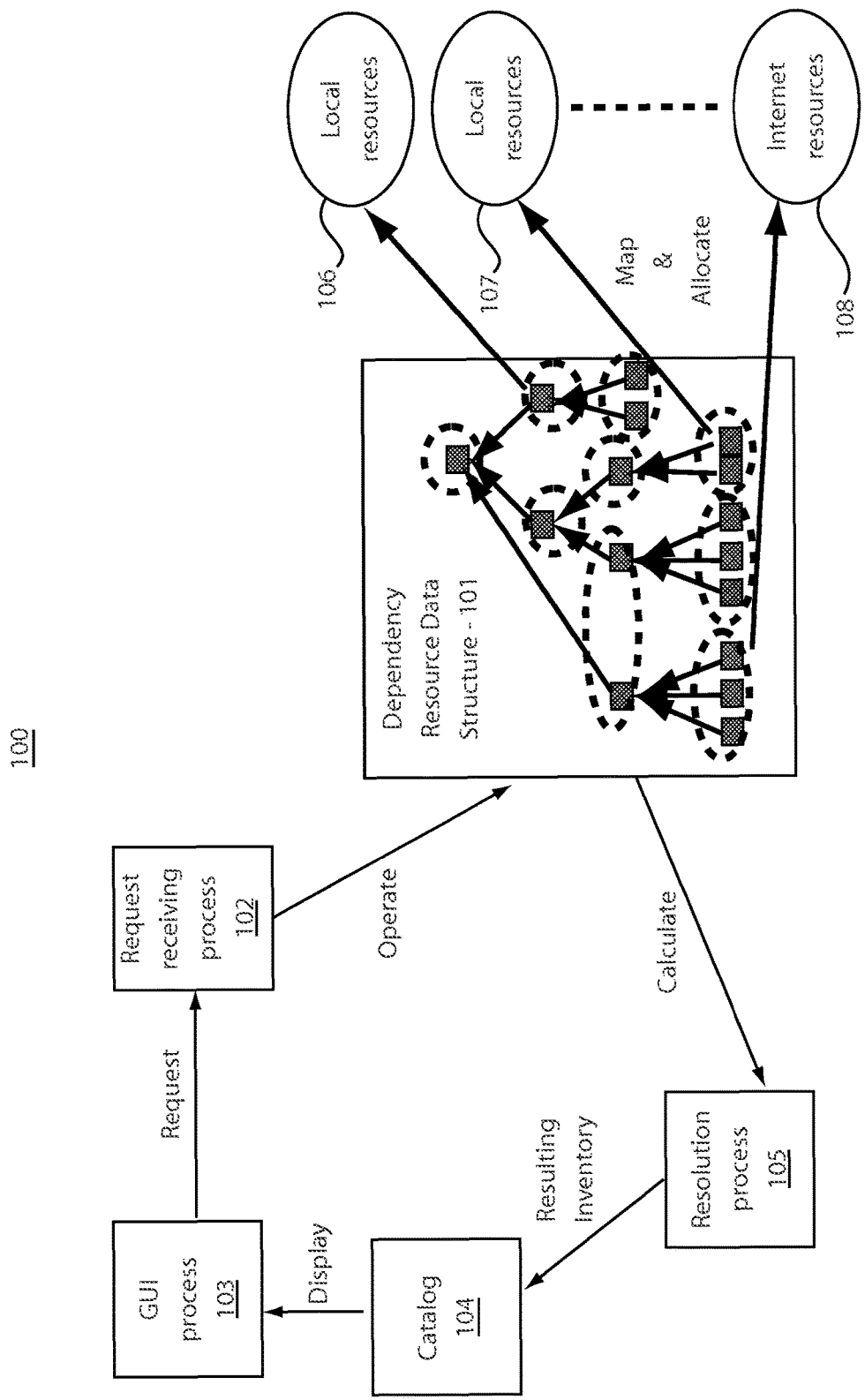
FIG. 1 a block/flow diagram showing a system/method for scheduling resource time in accordance with one embodiment.

In accordance with the present principles, systems and methods are provided for users to schedule or reschedule reserved resources by negotiation using, e.g., user social networking information. In one embodiment, socially close or connected users can run or negotiate a resource together for efficient resource usage. Resource-availability visualization is provided to enable social resource usage behavior. Advantageously, resources can be negotiated peer to peer (as opposed to peer to system) and can increase the efficiency of the resource usage as well as user satisfaction. High performance computing (HPC) services in a cloud can take advantage of such systems and methods.

The present invention provides an effect mechanism for users (or machines) to schedule or reschedule reserved resources by negotiation using user social networking information. Usually, socially close users would like to run or negotiate the resource together for efficient resource usage. Without the global resource availability capability visualization, it will inhibit this social resource usage behavior. Negotiating peer to peer (or peer to owner) can increase the efficiency of the resource usage as well as user satisfaction.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to the drawings in which like numerals represent the same or similar elements and initially to FIG. 1, a system/method 100 for scheduling resource time is illustratively shown in accordance with one embodiment. System 100 may include a graphical user interface (GUI) 103 or other input mechanism for receiving requests and viewing a catalog of time available slots, available resources, etc. A request receiving module 102 receives one or more requests for resource time. The receiving module 102 processes the requests to ensure proper formatting, to prioritize the requests, and to provide other request processing features. The request receiving module 102 submits the requests to a dependency resource data structure 101. The data structure 101 relates or maps relationships between resources. This includes availability of different resources, requirements for each resource, costs, etc. The resources may include local resources 106, 107, Internet resources, 108, or any other resource. Each resource inventory operation has a mathematically calculable dependency on the other resources in inventory in the tree 101. The number of currently available inventories can be easily computed.

A resolution process module 105 receives the data dependency information for data structure 101 and resolves or computes entries for the catalog 104. The resolution process 105 determines which physical resources are available for a user or are available after a user operates on one or more catalog offerings by changing at least one of the type attributes. The resolution process module 105 outputs a result inventory that provides an updated list of offerings in the catalog 104. A user (or user machines) can use the catalog 104 to select and negotiate resource usage using the GUI 103.

Figure 2:
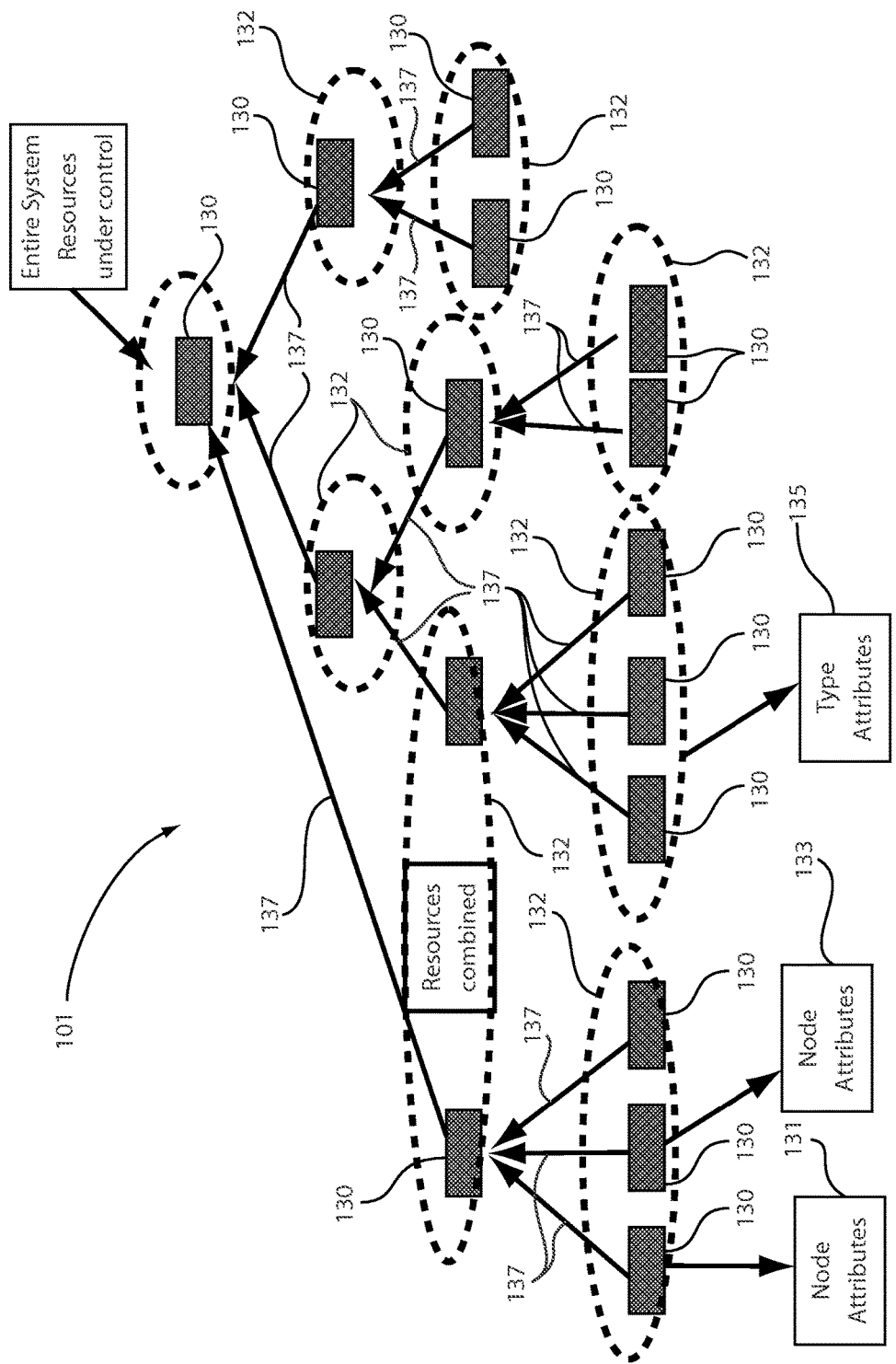
FIG. 2 a block/flow diagram showing a dependency resource data structure for hierarchically arranging resources and time slots in accordance with one embodiment.

Referring to FIG. 2, the dependency resource structure 101 is shown in greater detail. Structure 101 dynamically maps physical resource types, attributes, etc. hierarchically. The data structure 101 includes nodes 130. The nodes 130 include attributes, such as, number of processors or machines, CPU, bandwidth, etc. The nodes 130 may be grouped into types 132 and the types have attributes as well. For example, a type may include location, operating system used, applications available, etc. The types may also include combinable resources, e.g., cloud network, home network, etc. In its hierarchy, the data structure 101 provides levels of resources structured so that the level above includes the nodes/types of resources connected to it from below. For example, a top node/type 136 includes the entire system resources under control.

In one embodiment, the data structure 101 includes a plurality of node records 130. Each node record 130 has one or more node attributes, and one or more of the node attributes are physical node attributes 131 associated with physical resources and one or more of the node attributes are social node attributes 133. A plurality of type records 132 has one or more type attributes 135 and a reference to one or more of the node records 130. The node records 130 and type records 132 may be defined by a service provider. The type record is preferably associated with a catalog offering in catalog 104 that the service provider offers to one or more users over one or more networks. Structure 101 includes one or more dependency records 137 each defining a dependency between a pair of nodes.

The social node attributes 133 may identify user participation in one or more social networks, user preferences, user equipment identification or other pertinent but user-specific information. The physical assets of the node attributes 131 may include one or more of memory allocation, a number of computer resources, a communication resource, etc. The users participating in the social network can communicate with one another or the resource owners to negotiate scheduling of the physical assets. The scheduling of physical assets may include an exchange of physical assets, a sale of an allocation physical asset, an extension of time allocation, a borrowing of a physical asset, a change of time allocation of a physical asset, etc.

Figure 3:
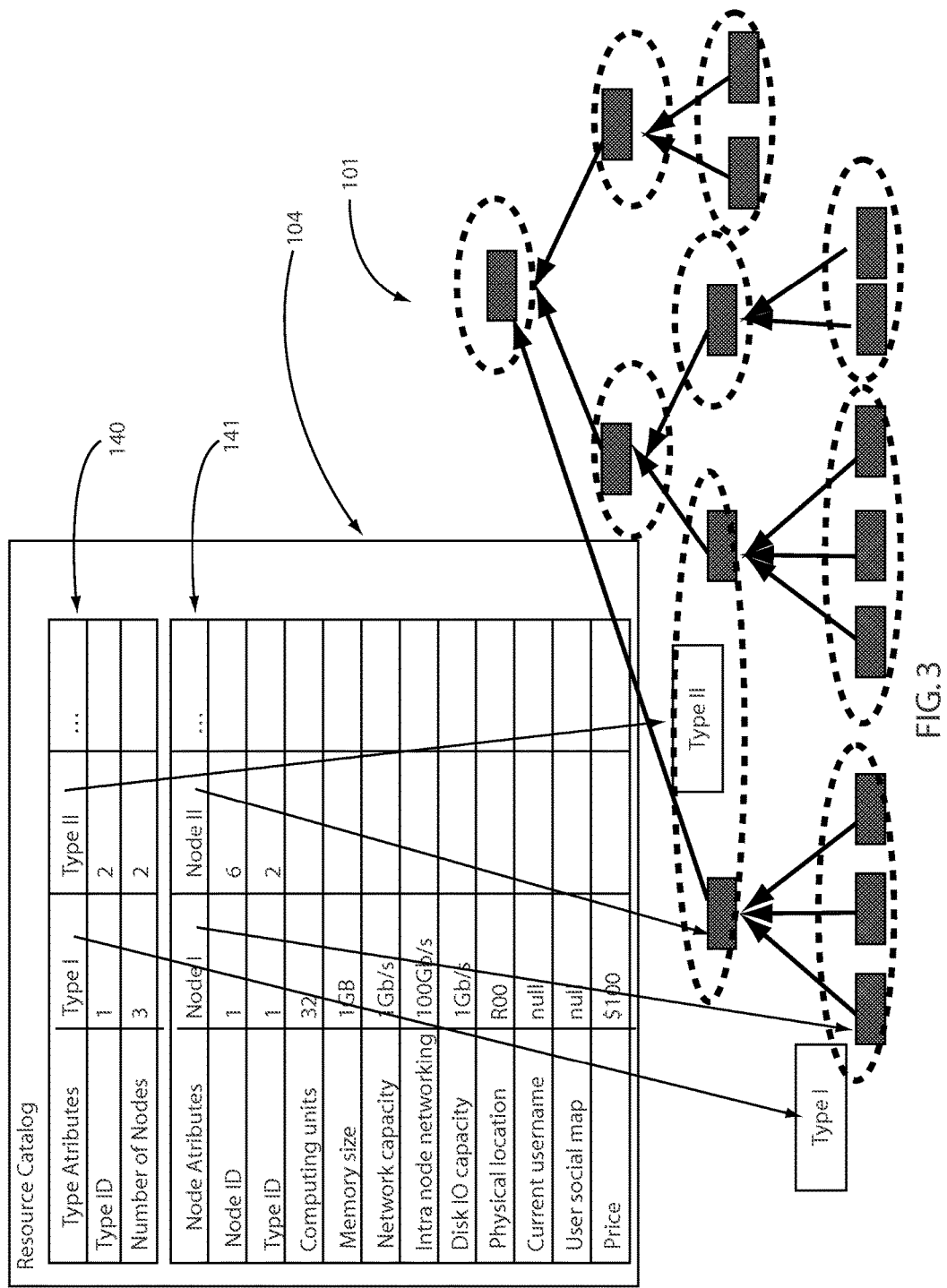
FIG. 3 is a diagram showing a resource catalog in accordance with one illustrative embodiment.

Referring to FIG. 3, an illustrative resource catalog 104 is illustratively depicted with the data structure 101. In this example, catalog 104 includes type attributes 140 (e.g., Type I and Type II). Other information may include Type ID, number of nodes in the type, etc. Catalog 104 further includes node attributes 141 corresponding to the type attributes 140. Node attributes 141 may include Node ID, Type ID, computing units, memory size, network capacity, intra-node networking, disk input/output capacity, physical location, current username, user social map, prices, etc.

Figure 4:
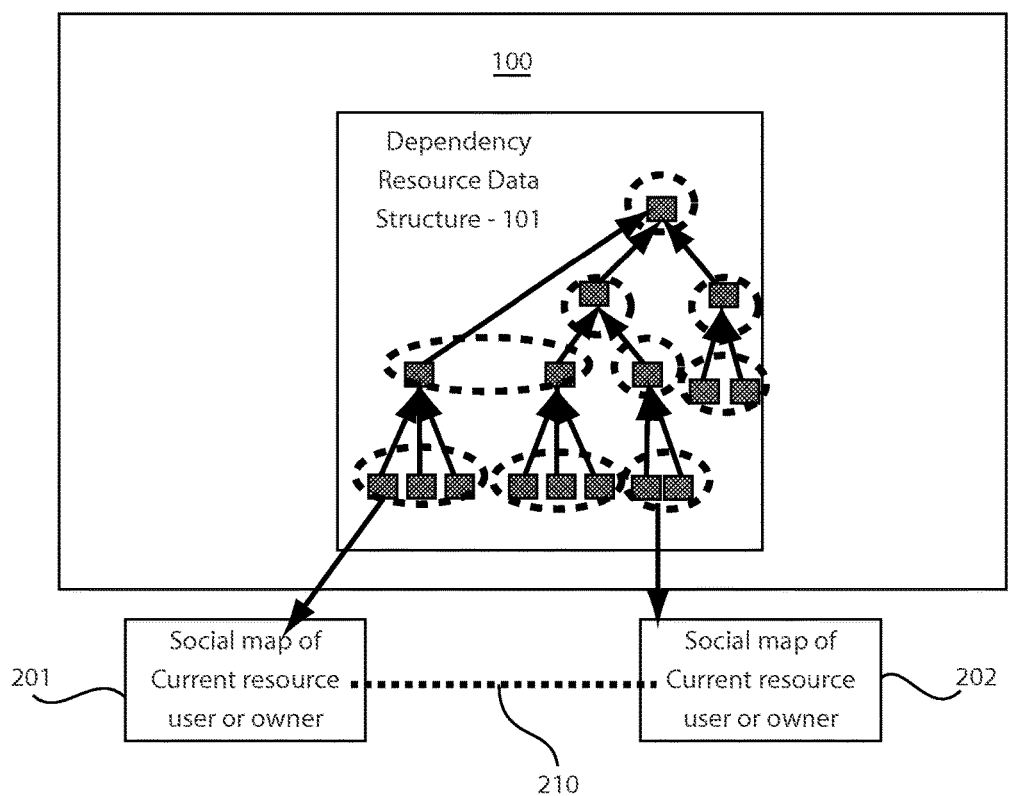
FIG. 4 is a block/flow diagram showing a system/method with social maps associated with nodes (resources) in the dependency resource data structure in accordance with one embodiment.

Referring to FIG. 4, a system 200 includes system 100 and employs social maps of users 201, 202. Social maps of users 201 and 202 include information about user friends and user needs in terms of resources. These maps 201, 202 permit users to join together in groups to negotiate favorable terms for the group. Users may search other user maps to determine user needs and requirements. For example, if a user A would like to log time on a particular resource within two days but only needs the resource for one hour, and if the resource requires a minimum usage of two hours, the user A may search for another user B who needs the resource for only one hour and split the costs. Many other scenarios are contemplated. Some of which will be described herein.

Referring again to FIG. 1 with continued reference to FIG. 4, the present embodiments permit socially-aware resource scheduling and enhanced negotiation. System 200 collects, discovers, and organizes social topology information. Social topology information may include, e.g., a user's organizational structure, a friend list as manual input, mining links generated by users co-editing content, co-attending events, co-enrolling groups, etc., user to user relationships with degrees (the number of steps connecting two users) and weights (closeness estimates). The social topology information can be employed to assist in more effective scheduling. Schedules according to social topology information can be associated with the resource reservations in time and resource dimensions.

For the time dimension, the system 200 exposes to the users how "friendly" (e.g., measured by social connectivity scores between current users and existing owners of the resources) the users in adjacent time slots are. This information may be used to select resource owners or communicate with other users to negotiate better terms with the owners. For the resource dimension, when requested, the system 200 can schedule resources according to user preferences in terms of his/her social connectivity information (e.g., map a request to a same physical location with adjacent time slots as his/her friends). Owner preferences may also be employed. An owner refers to an owner of the resource. A user is the user of the resource.

The system 200 visualizes the social connectivity information and provided this information for viewing, e.g., on GUI 103 for a user or owner. For the time dimension, social connectivity links may be visualized (directionally and further perhaps illustrated with a numeric score). For the resource dimension, a reserved resource may be highlighted with social preferences confirmed. System 200 supports dynamically-created collaboration and negotiation channels 210 for exchange of information and resources among users 201 and 202. System 200 obtains feedback related to successful exchanges to incrementally reinforce the effectiveness and applicability of social topology information on resource scheduling.

Figure 5:
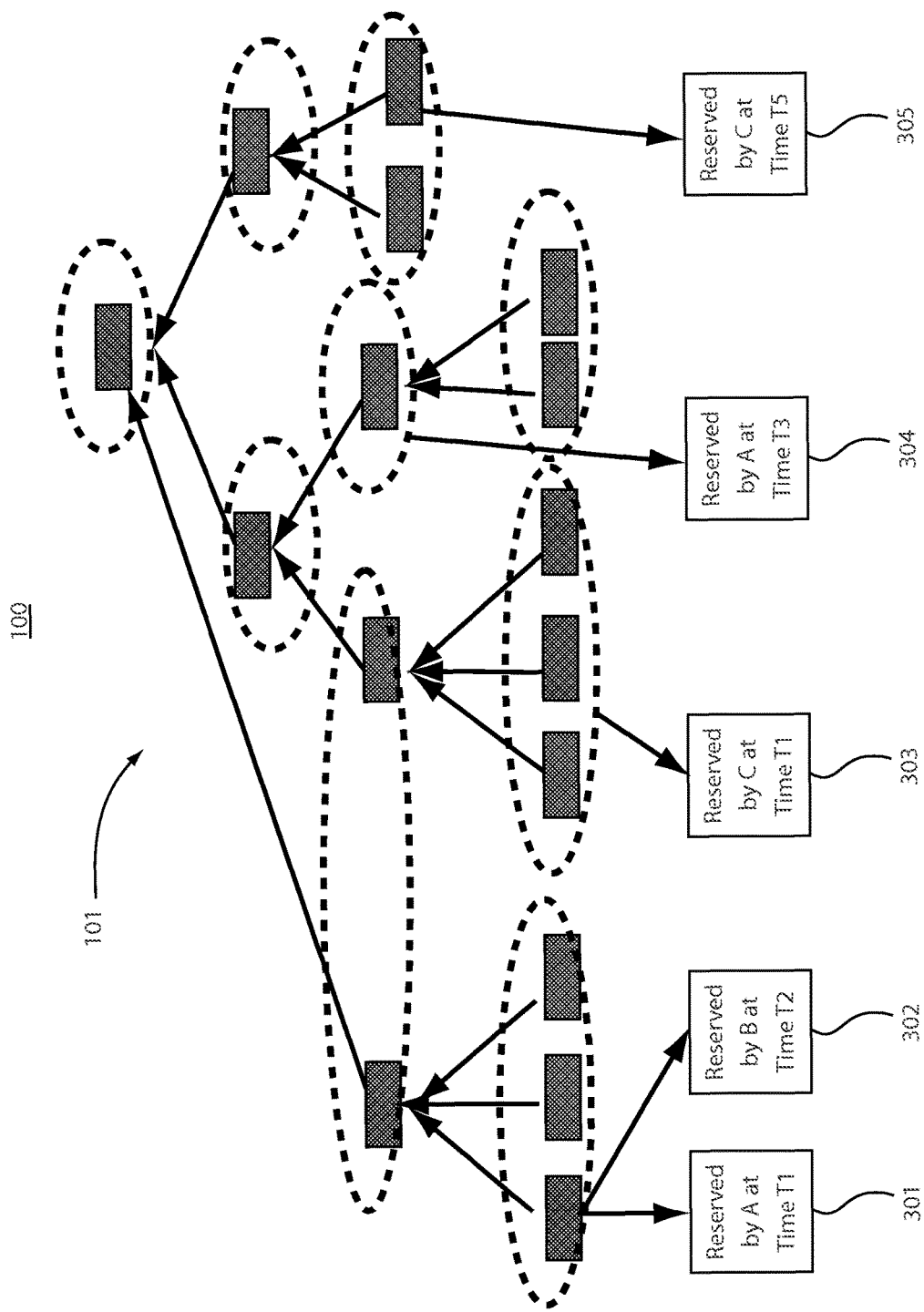
FIG. 5 is a block/flow diagram showing a system/method with reserved time slots by entity associated with nodes (resources) in the dependency resource data structure in accordance with one embodiment.

Referring to FIG. 5, a dependency resource data structure 101 for system 100 is depicted with entity associations. Entity associations 301, 302, 303, 304, 305 are depicted showing ownership of resources within the data structure 101. The entities (e.g., A, B and C) that have reserved times (e.g., T1, T2, T3, T5) are stored and associated with the resources. As resources and times slots are reserved, the data structure is populated with the respective information to provide a uniform and comprehensive reference for further reservations and negotiations.

Figure 6:
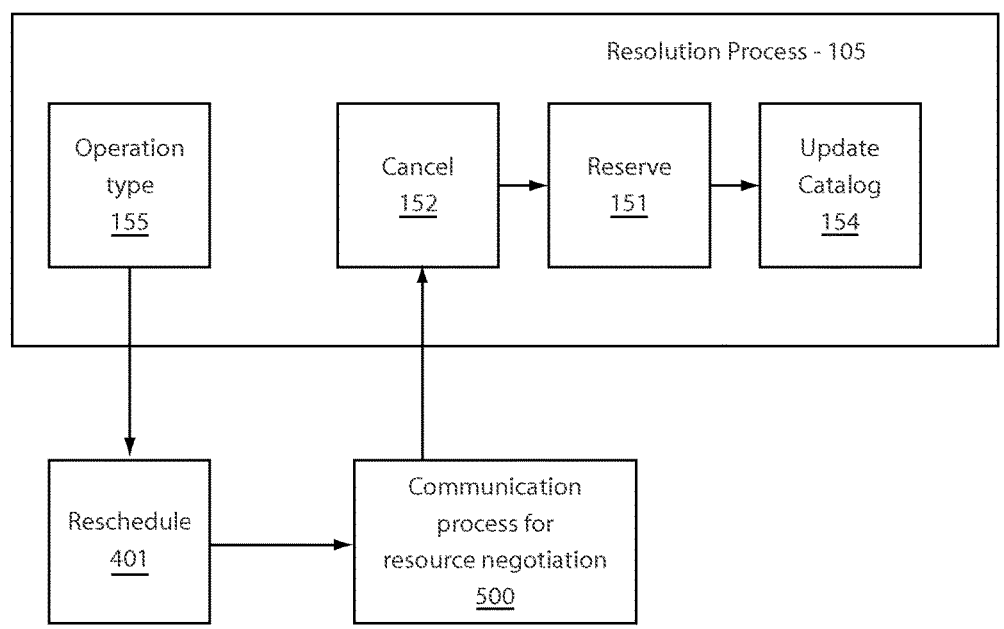
FIG. 6 is a block/flow diagram showing a resolution process for establishing communications for resources using social maps in accordance with one embodiment.

Referring to FIG. 6, a process flow is illustratively depicted for the resolution module 105. In the event of conflict between users for a given time slot or a given resource, a resolution process 105 is employed. For an operation type 155, a reschedule process 401 is attempted to change a time, a resource or both. This process may go smoothly if the entities involved are willing to accept the available time slots or resources; however, if the reschedule is not straightforward, a communication process 500 for resource negotiation is entered. The communication process may include a dialog between users, a request posted for users to swap time/resources, a request to piggyback to another entity's time slot or resource usage, etc. A determination of which users/owners may be included is preferably based upon social map information. The social map information may indicate that users are in a same business entity, or that the users have compatible needs based on the social map data, etc. The communication may be between users competing for resources, between resource owners, or between users and owners. Many scenarios may be implemented.

The communication/negotiation of process 500 may result in a cancellation of a reservation in block 152 and a new reservation in block 151. In block 154, the catalog 104 is updated with any changes.

Figure 7:
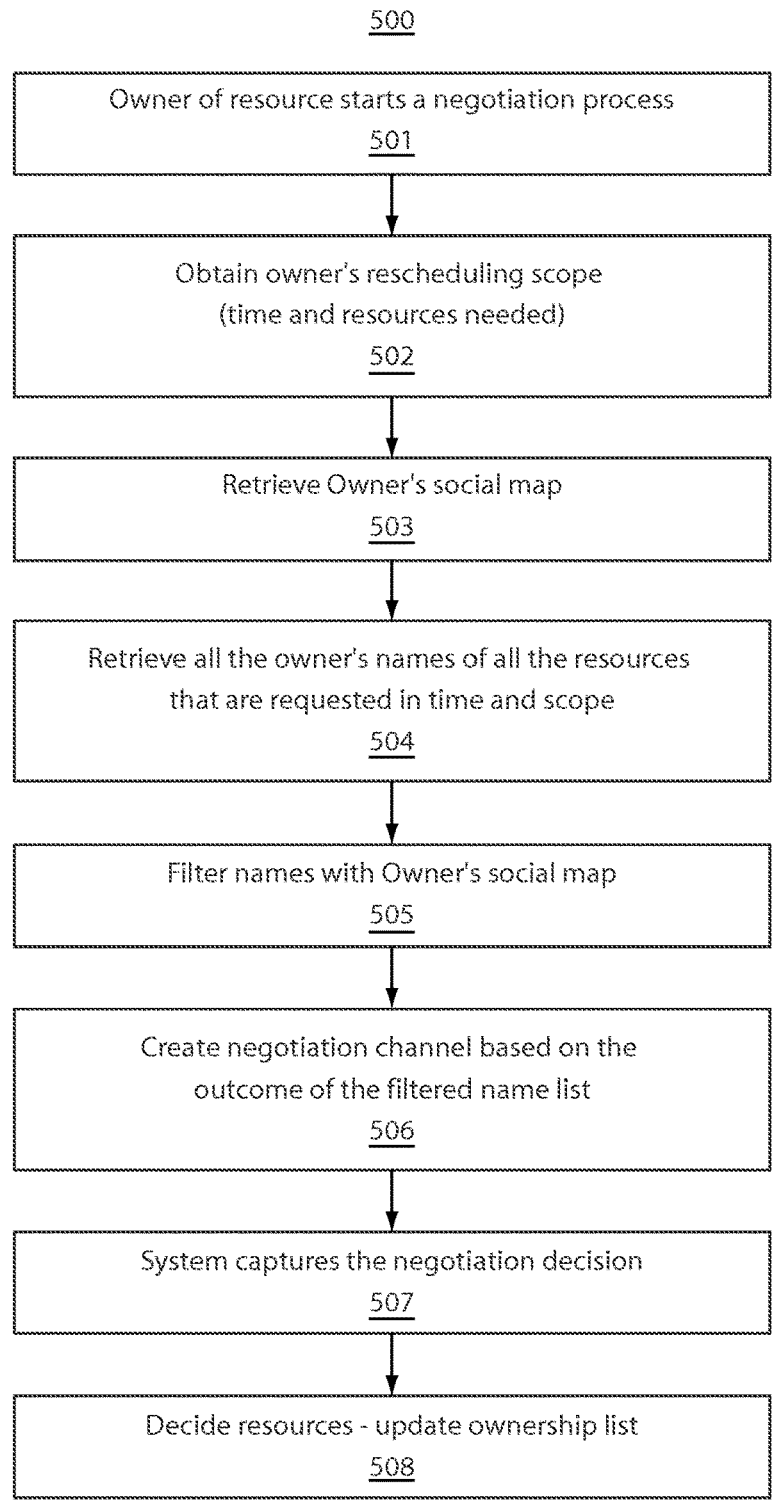
FIG. 7 is a block/flow diagram showing an illustrative resource negotiation process using social maps in accordance with one embodiment.

Referring to FIG. 7, the communication process of block 500 is depicted in greater detail. In block 501, an owner of one resource may begin the negotiation process. This may include an actual owner of a device, system of device, etc. that publishes a rate or availability of the resource. An owner may also mean a user that has already reserved a particular device and/or a time slot. In block 502, a rescheduling scope (time and resources) is determined or obtained. This may include determining available time/resources or determining if time can be opened up through requests to other users. In block 503, retrieve social maps of owners and/or users. In block 504, retrieve all of the user's/owner's names for all resources and time slots within the scope of a request for resources. In block 505, using the user's/owner's social map(s), filter the names using the social map. For example, the social maps may include rate information. The owner's may be filtered based upon the rate charged for resources. Other criteria may be applied.

In block 506, a negotiation channel may be opened up between users and/or owners based upon the outcome of the filtered name list. The negotiation permits bargaining of terms between the participants or their respective machines. In block 507, a negotiation decision is arrived at and captured by the system. Resource ownership/scheduling is updated in block 508.

Figure 8:
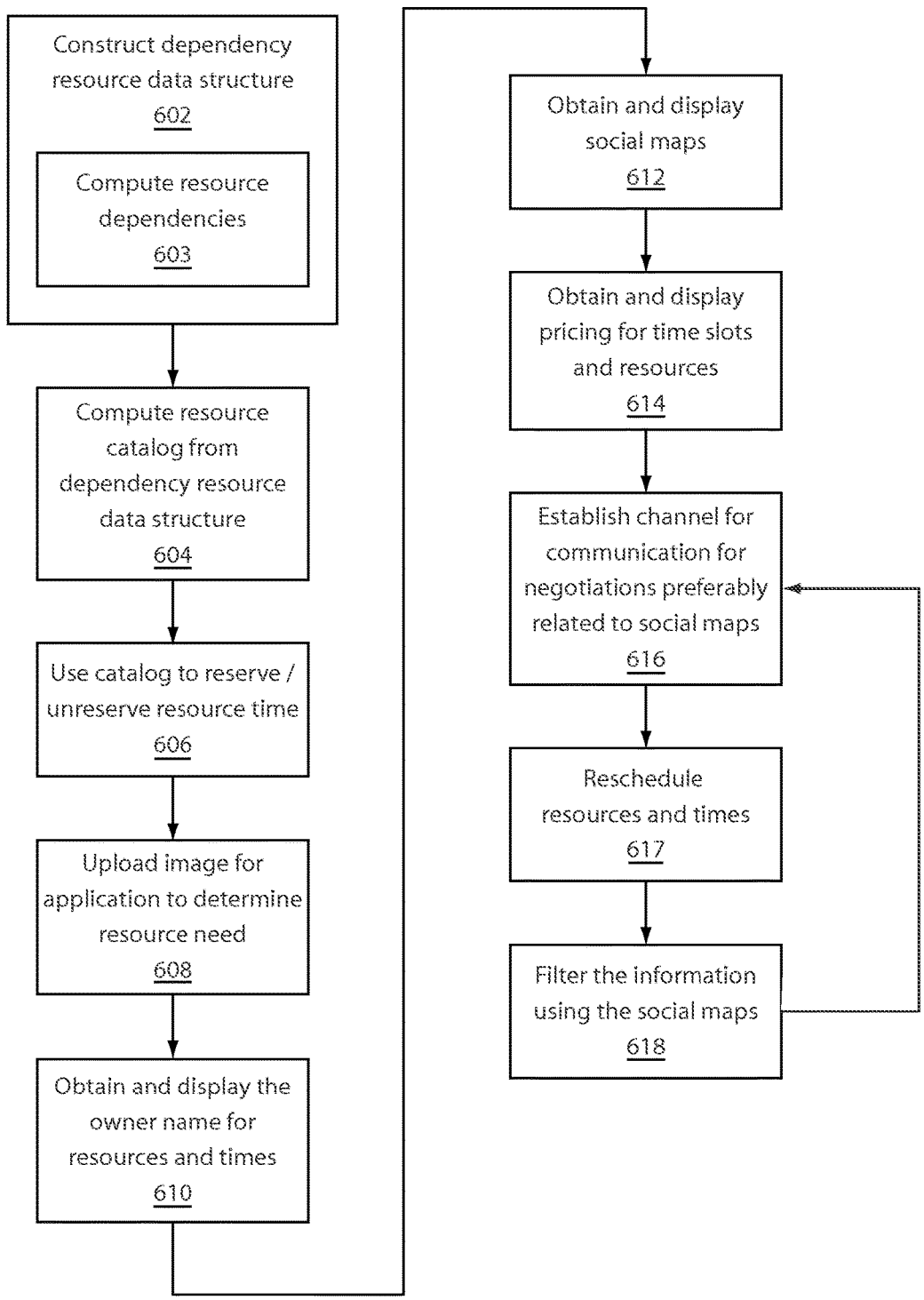
FIG. 8 is a block/flow diagram showing an example for scheduling resources in accordance with one illustrative embodiment.

Referring to FIG. 8, an illustrative scenario is shown in accordance with one embodiment which employs a cloud network. In block 602, a resource hierarchical tree definition (e.g., data structure 101) is constructed for the system resources. The hierarchical resource tree is created and defined to partition and organize the system resources. An overall system resource inventory is represented explicitly as a hierarchical resource tree for efficiently describing system resources and calculating categories for user visualization and reservation. Each resource inventory operation has a mathematically calculable dependency on the other resource inventories in the tree. The number of currently available inventories can be easily computed using a resource tree computing method in block 603.

In block 604, the system resource hierarchical tree definition is processed to compute and define a resource catalog (104) and its available inventory under each category for users to view. This includes computing a resource category and an inventory of each category.

In block 606, a user (or machine) employs the catalog to reserve or unreserve a set of available inventory at a current and/or future time. In block 608, an application image is uploaded with a related set of resources defined in the resource catalog that are needed to run the application. In block 610, the owner of the reserved resources and times is obtained and displayed. A dynamic mapping of the resource inventory and times with the associated reservation owner is displayed, e.g., on a GUI.

In block 612, user (and/or owner) social maps related to particular resources and times are obtained and displayed to owners and/or users. In block 614, individual pricing information for all available resource inventories at all time slots is obtained and displayed. In block 616, a dynamic real time collaboration channel may be established which permits resource and time slot negotiations and collaborations related to social maps of owners and/or users. This may include a dynamic mapping of the resource inventory with an owner's social group members that are in related time slots. This information may be displayed for scheduling, re-scheduling and collaboration.

In block 617, rescheduling of resources and times may be performed. If there is a conflict, the system will provide a set of socially preferred names that are related to a set of particular resources for collaboration and rescheduling. In block 618, filtering controls are provided to narrow the search space of potential owners or users. The filtering may employ social related data and preferences stored in user/owner profiles. The user's/owner's social preferences may be employed so that the system can dynamically set up a collaboration channel using the provided social preferred names for collaborative negotiation (block 616).

Having described preferred embodiments of a system and method for dynamic rescheduling of multiple varying resources with user social mapping (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for scheduling computing resources, comprising:

determining relationships, using social maps, of resource users and resource owners, among the resource users and resource owners to filter catalog entries from a catalog of available computing resources and time slots for accessing the available computing resources, the filtered catalog entries indicating computing resources and time slots available for negotiations and collaborations among the resource users and resource owners;

scheduling the available computing resources and time slots, using a channel for communication based on the social maps for the negotiations and collaborations, in accordance with results of the negotiations and collaborations; and updating the catalog in accordance with the results, wherein the scheduled computing resources are used by the resource users in accordance with the results.

2. The method as recited in claim 1, wherein the catalog is stored in computer storage memory and employs a resource data structure that includes a hierarchy of the available computing resources including a plurality of node records arranged by type.

3. The method as recited in claim 2, wherein the resource data structure is updated by a resolution process that computes usage of the available computing resources and time slots.

4. The method as recited in claim 1, wherein determining relationships using social maps includes comparing at least one of resource user participation in one or more social networks, resource user preferences, and resource user equipment identification.

5. The method as recited in claim 1, wherein the catalog includes a listing for pricing of tasks.

6. The method as recited in claim 1, wherein the communication channel permits trading of time slots, exchanging of computing resources and negotiating price.

7. The method as recited in claim 1, wherein updating the catalog in accordance with the results includes displaying updated computing resource allocations and time slots by entity.

8. The method as recited in claim 1, wherein the catalog includes social map information identifying participation of a resource user or resource owner in one or more social networks.

9. The method as recited in claim 1, wherein one of participation of a resource user or resource owner in a social network and a preference in a social map is employed to initiate the negotiations and collaborations.

\* \* \* \* \*